Aug. 6, 1935.     H. R. GEER     2,010,663
REEL ASSEMBLING MACHINE
Filed April 12, 1934     6 Sheets-Sheet 2

Fig. 2.

Inventor
Harry R. Geer.
By R. S. A. Dougherty.
Attorney Aug. 6, 1935.  H. R. GEER  2,010,663
REEL ASSEMBLING MACHINE
Filed April 12, 1934  6 Sheets-Sheet 3

Inventor
*Harry R. Geer.*
By *P. S. A. Dougherty*
Attorney

Aug. 6, 1935. H. R. GEER 2,010,663
REEL ASSEMBLING MACHINE
Filed April 12, 1934 6 Sheets-Sheet 5

Inventor
Harry R. Geer.
By R. S. C. Dougherty
Attorney

Aug. 6, 1935. H. R. GEER 2,010,663
REEL ASSEMBLING MACHINE
Filed April 12, 1934 6 Sheets—Sheet 6

Inventor
Harry R. Geer.
By R. S. A. Dougherty
Attorney

Patented Aug. 6, 1935

2,010,663

UNITED STATES PATENT OFFICE 2,010,663

REEL ASSEMBLING MACHINE

Harry R. Geer, Westmont, Pa., assignor to Bethlehem Steel Company, a corporation of Pennsylvania Application April 12, 1934, Serial No. 720,161

40 Claims. (Cl. 140—71)

My invention relates to the manufacture of reels or spools upon which barbed wire or wire or the like is wound for shipment and commercial use, and more especially to a machine for assembling and securing together the parts of which the reel is formed.

One of the objects of my invention relates to the manner of supporting and holding the tie and core members in the machine so they can be easily attached to the arms of the reel ends.

Another object of my invention relates to the mechanism for advancing the dies into engagement with the ends of the tie and core members.

A further object of my invention relates to the means for simultaneously clinching all of the ends of the core and tie members on the arms of the reel end at one operation.

Another object of my invention relates to the manner of holding and discharging the reel from the machine.

A still further object of my invention relates to the means for automatically releasing both dies from the ends of the reel.

Other objects of my invention will appear hereinafter.

Having thus given a general description of my invention, I will now in order to make the same more clear, refer to the annexed six sheets of drawings forming a part of this specification, and in which like characters of reference refer to like parts.

Referring now to the various characters of reference on the drawings which form part of this specification. The base plate is indicated as 1, for supporting an upwardly extending pedestal, comprising a web-plate 2 provided with flanged sides 3 formed integral with the base plate 1. The upper end of the web-plate 2 is inclined as at 4 and formed with a rectangular head 5, which is grooved on opposite sides as at 6, to receive the tongues 7 of slide-plates 8 which are secured thereto by means of bolts 9, and project upwardly therefrom to receive a pair of right and left slides 10 and 11 respectively. As the slides 10 and 11 are of similar construction with the exception that they are right and left, a description of one will apply to both. One end of each slide is formed with a laterally extending bracket arm 12 perforated as at 13 for the passage of a feed-screw shaft 14, and at 15 for receiving a bolt 16 for attaching the anvils 17 thereto. The anvils 17 are provided with radial arms 18 perforated as at 19 to receive the shanks 20 of die-sets 21, each having the face of its heads grooved as at 22 for engaging the hooked ends of the core members. These die-sets 21 are retained in position on the anvils by means of nuts 23. A socket 24 is formed in the face of each anvil 17 at an intermediate point in radial alignment with one of the arms 18 in which is mounted in a similar manner another die-set 21 for engaging the hooked ends of a tie member, the purpose of which will be more fully described hereafter.

Each slide 10 and 11 has formed integrally therewith at an intermediate point an upwardly extending bending-die supporting portion 25, which is perforated as at 26 for the passage of the feed-screw shaft 14 and provided with vertically aligned supporting arms 27 and 28, formed integrally therewith and horizontally aligned swinging front and back arms 29 and 30 mounted in recesses 31 and 32 and pivoted thereto as at 33.

The arms 27, 28, 29 and 30 are each provided with a socket 34 and a tubular opening 35 for receiving the heads 36 and shanks 37 respectively of bending-dies 38. The construction of this bending-die is more clearly illustrated in Figs. 13, 14, 15 and 16, is grooved longitudinally as at 39 to allow the assembling or removal of the core members or the formed reel, while the head 36 is formed with a socket projection 40 provided with a curved surface 41 for bending over the hooked end 42 of the core members 43, between the shoulders 44 and the looped arms 45 of the reel ends 46.

An expander 47 is secured centrally by means of a screw 48 and dowel-pin 49 to the side of the extending bending-die supporting portions 25 between the aligned bending-die supporting arms adapted to extend into the closed ring 50 in the center of the reel ends during the clinching operation, so it will retain its shape. This closed ring 50 forms the spindle bearing opening for the reel when formed and wound with barbed wire or wire enabling it to be placed and secured in wire reeling and unreeling positions.

A socket and a tubular opening is formed in each of the extending bending-die supporting portions 25 just above the expander 47 and in alignment with the vertical supporting arms in which is mounted another bending-die 38 similar in construction to the bending-dies in the supporting arms 27, 28, 29 and 30. The three vertically aligned bending-dies 38 being arranged with the mouths of their grooves 39 upwardly, while the bending-dies in the swinging arms have their grooves horizontally disposed with the mouths facing towards the front of the machine.

Figure 4:
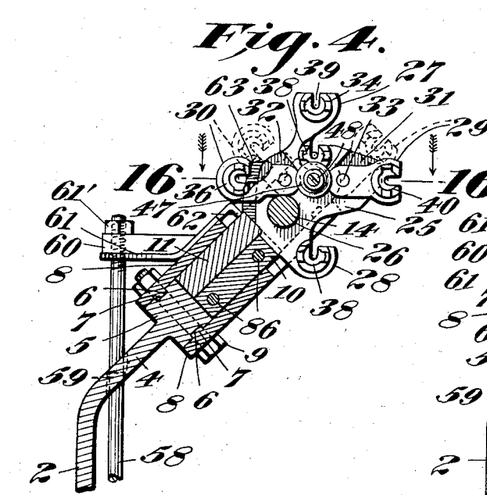
Fig. 4 is a transverse section taken on the line 4—4 of Fig. 3.
Figure 5:
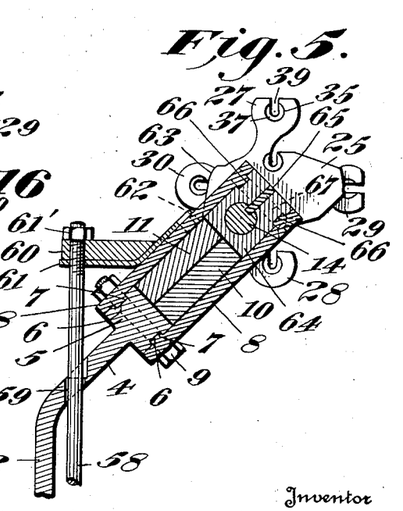
Fig. 5 is a transverse section taken on the line 5—5 of Fig. 3.
Figure 6:
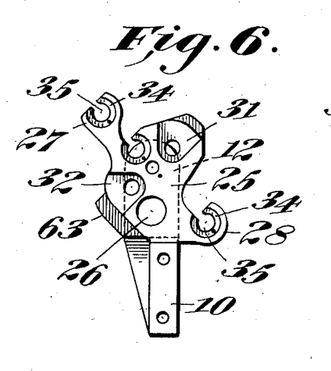
Fig. 6 is an end elevation of the right slide showing the sockets and recesses for receiving the bending-dies and swinging-arms.
Figure 7:
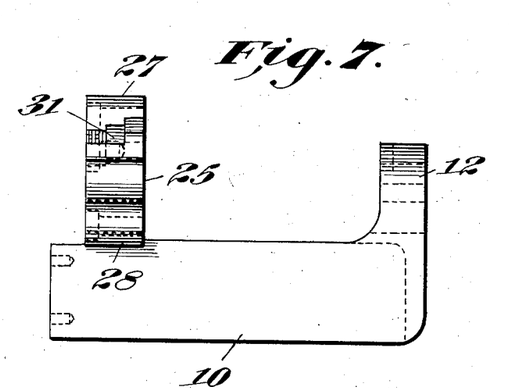
Fig. 7 is a side elevation of the right slide.
Figure 8:
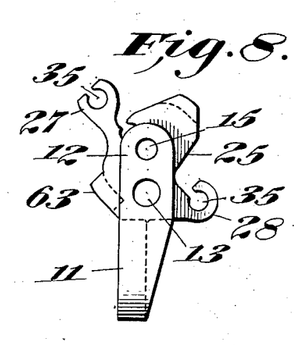
Fig. 8 is an end elevation of the left slide.
Figure 9:
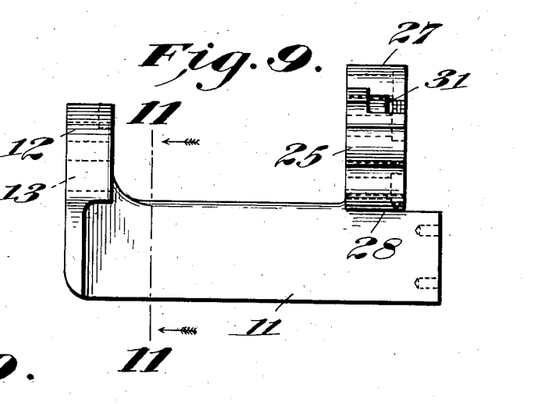
Fig. 9 is a side elevation of the left slide.
Figure 10:
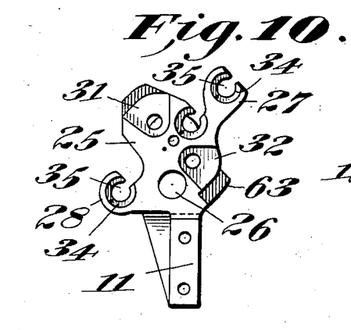
Fig. 10 is an end elevation of the opposite end of the left slide to that shown in Fig. 8.
Figure 11:
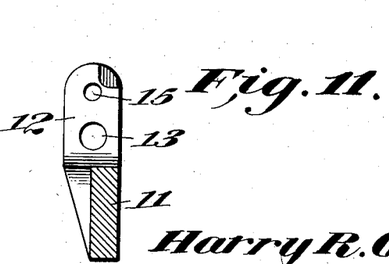
Fig. 11 is a transverse section of the left slide taken on the line 11—11 of Fig. 9.
Figures 12, 13, 14:
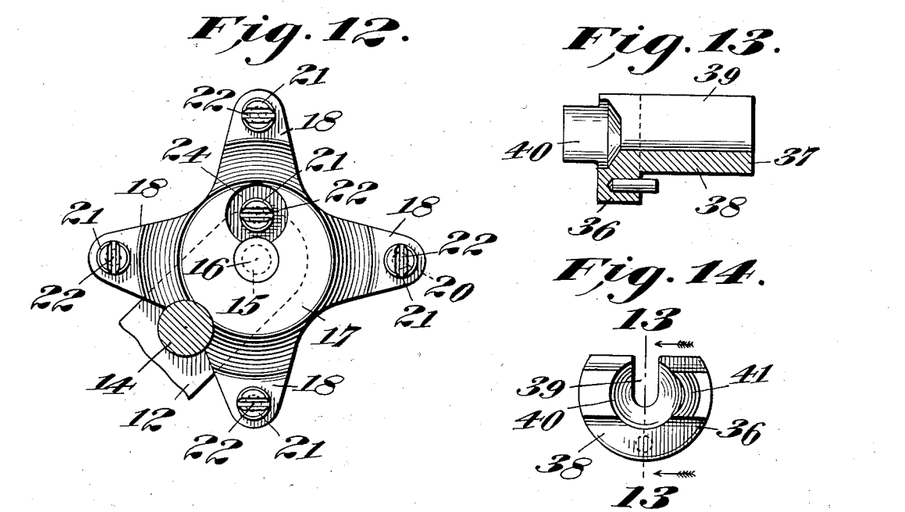
Fig. 12 is a detail view of one of the anvils.
Fig. 13 is a detail longitudinal section of one of the bending-dies drawn on a larger scale, taken on the line 13—13 of Fig. 14.
Fig. 14 is a front elevation of one of the bending-dies.
Figure 15:
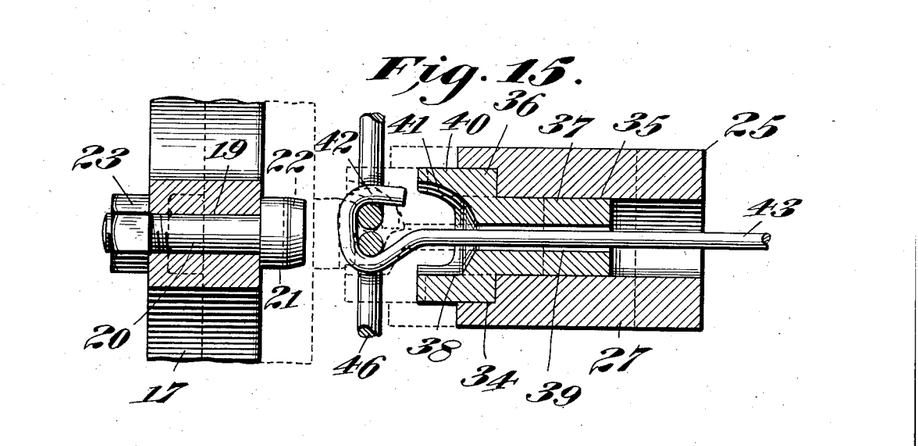
Fig. 15 is a detail illustrating the manner of clinching the ends of the core members of the reel to the reel ends.
Figures 16, 17, 19:
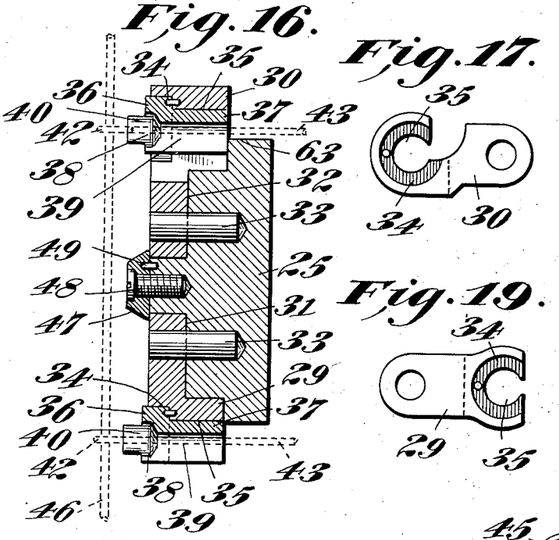
Fig. 16 is a detail section through one of the extending bending-die supporting portions taken on the line 16—16 of Fig. 4, illustrating the manner of mounting the swinging-arms and the bending-dies.
Fig. 17 is a side elevation of one of the swinging-back-arms.
Fig. 19 is a side elevation of one of the swinging-front-arms.
Figure 18:
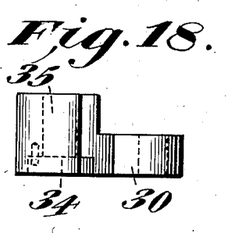
Fig. 18 is a top plan view of the swinging-back-arm shown in Fig. 17.
Figure 20:
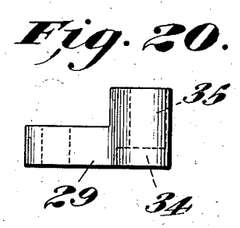
Fig. 20 is a top plan of one of the swinging-front-arms.
Figure 21:
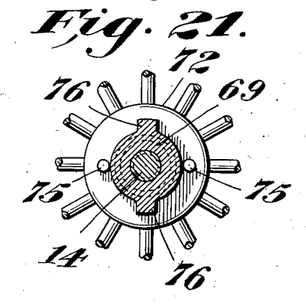
Fig. 21 is a detail section of the feed-screw shaft and nut taken on the line 21—21 of Fig. 3.

A longitudinal shaft 51 is journaled in bushings 52 in the lower portion of the flanges 3 of the pedestal. The shaft being retained in position by means of a collar 53 and the hub 54 of a lifter-pedal 55. A crank-arm 56 extends rearwardly from one end of the hub 54 provided with a pin adapted to pivotally connect the clevis 57 at the lower end of a lifter-rod 58. The lifter-rod 58 extends upwardly through a hole 59 in the inclined portion 4 of the web-plate 1, the upper end being threaded and screwed into the arm 60 of a lifter-plate 61 and retained in position by a nut 61'. The intermediate portion of the lifter-plate 61 normally engages the back slide-plate 2, the upper end being bifurcated and the edges bent over as at 62, which are adapted when the lifter-pedal 55 is pressed down, to engage the lower surface of the swinging back arms and raise them into the dotted position indicated in Fig. 4, so that a core member may be inserted in the grooves 39. After the lifter-pedal has been released the swinging back arm will return by gravity to the position indicated in full lines in the figure.

In this position the core member is held locked and prevented from being removed by engaging the shoulder 63 projecting rearwardly from the extending bending-die supporting portions 25.

A spacing-block 64 is mounted on and keyed to the feed-screw shaft 14 by means of a spline 65 between the extending bending-die supporting portions 25 of the right and left slides 10 and 11. The opposite sides of the spacing-block is grooved as at 66 to receive tongues extending inwardly from the upper portions of the slide-plates 8. The width of the upper portions of said slide-plates being narrower at this point to correspond with the length of the spacing-block 64, the parts being secured together by means of bolts 67.

The feed-screw shaft 14 has one end portion threaded as at 68 for receiving a nut 69 provided with a roller bearing 70 which is retained in a socket in its inner end for engaging a thrust-disk 71. The hub 72 of a hand-wheel 73 is rotatably mounted loosely on the nut 69 and retained in position by means of a nut 74 which is threaded on the outer end of the nut 69. The hub 72 is provided with a pair of pins 75 extending from its inner side for engaging contact projections 76 extending from diametrically opposite sides of the nut 69. A collar 77 is secured to the threaded outer end of the feed-screw shaft 14 to limit the outward movement of the nut.

The feed-screw shaft 14 has the end opposite the threaded portion formed with a head 78 to which is attached a piston 79 mounted in a fluid pressure cylinder 80, provided with a fluid supply connection 81, controlled by a valve 82. This cylinder 80 is open at one end and provided with a safety yoke 83, while the inner end of the cylinder is formed with a neck 84 adapted to engage the laterally extending bracket arm 12 of the left slide 11.

A spring bracket 85 is attached to one end of each of the slides 10 and 11 by means of bolts 86, the said spring brackets each having its lower end projecting downwardly therefrom and offset and provided with a perforation 87 for the passage of the intermediate portion of a bolt 88. These bolts each have their inner ends threaded into the head 5 of the pedestal and each have mounted on their outer ends a nut 89 and a washer 90 with a spring 91 interposed between the washers and the spring bracket 85, by means of which the slides 10 and 11 are returned to normal position after each clinching operation.

Figure 23:
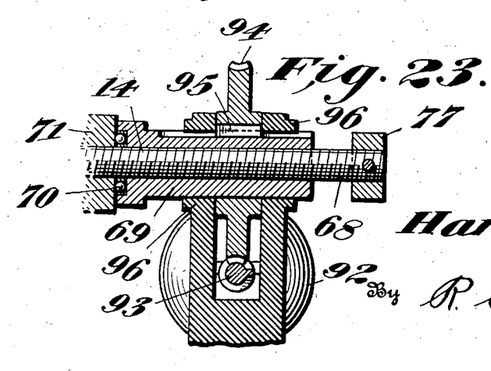
Fig. 23 illustrates a modified manner of rotating the nut on the feed-screw shaft by means of a motor and worm gearing.

In Fig. 23 I have shown power mechanism for rotating the nut 69 by means of a motor 92 provided with a worm 93, on its shaft meshing with a worm-wheel 94 which is keyed at 95 to the nut 69 between the journal bearings 96, otherwise the construction of the threaded end of the feed-screw shaft 14 and parts mounted thereon are the same.

Figure 1:
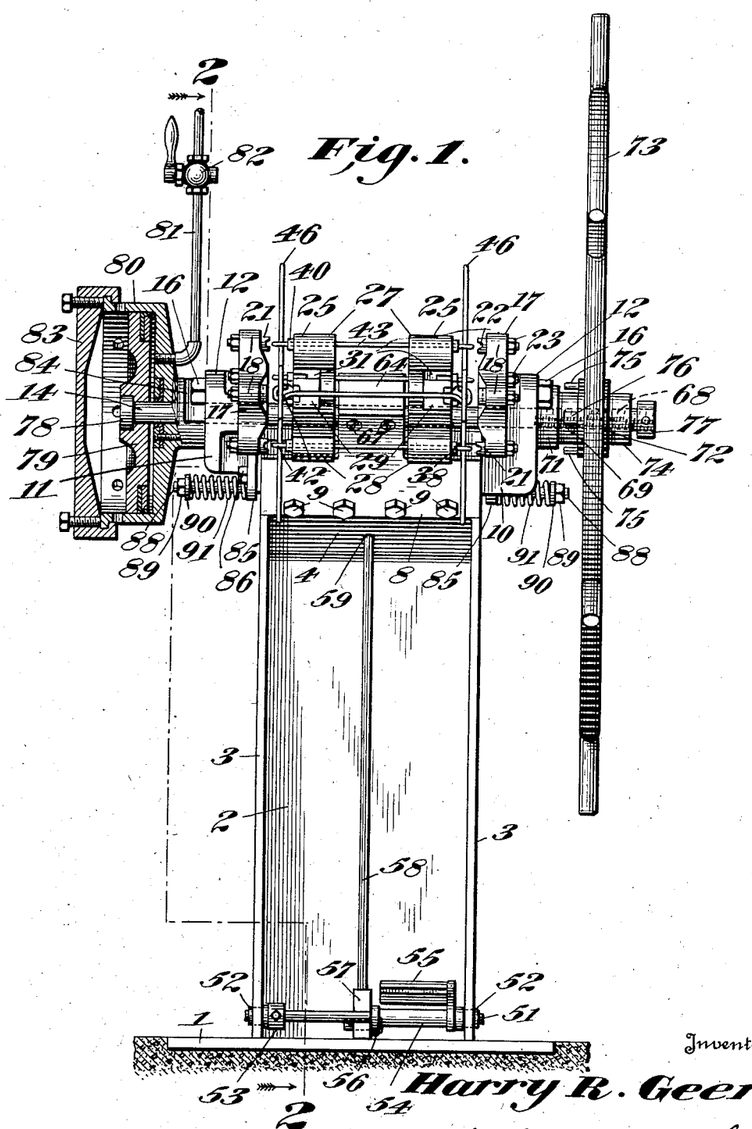
Figure 1 is a front elevation of my assembling machine with the air cylinder shown in section.
Figure 2:
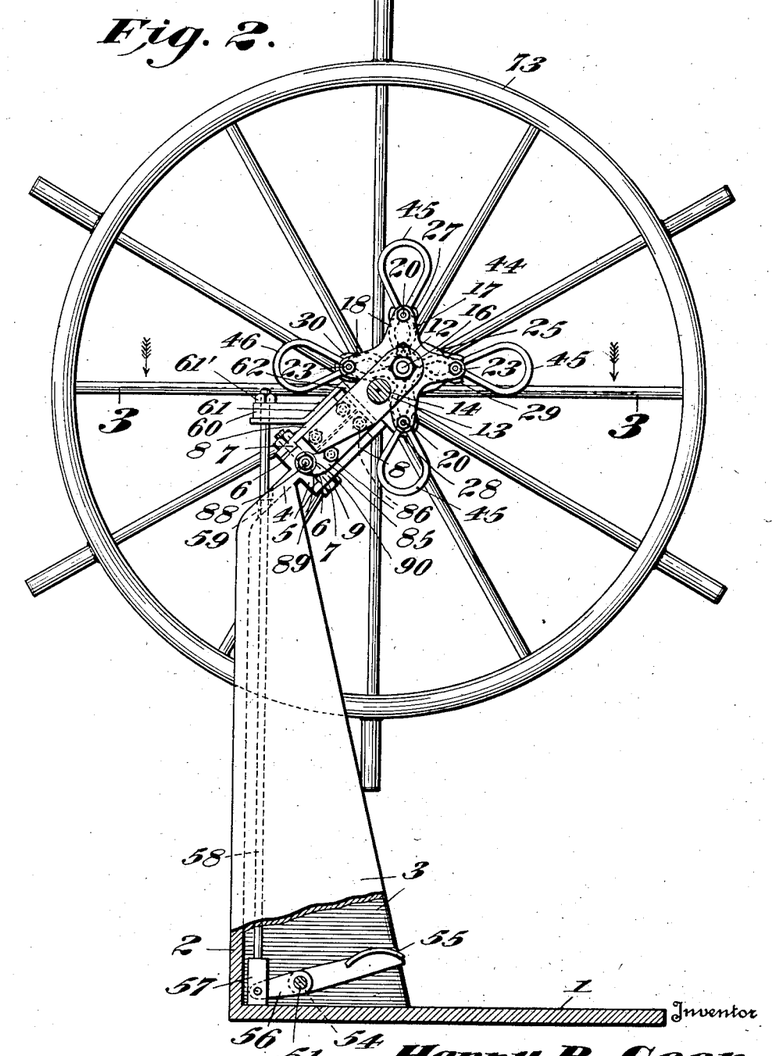
Fig. 2 is an end elevation with parts shown in section, the view being taken on the line 2—2 of Fig. 1.
Figure 3:
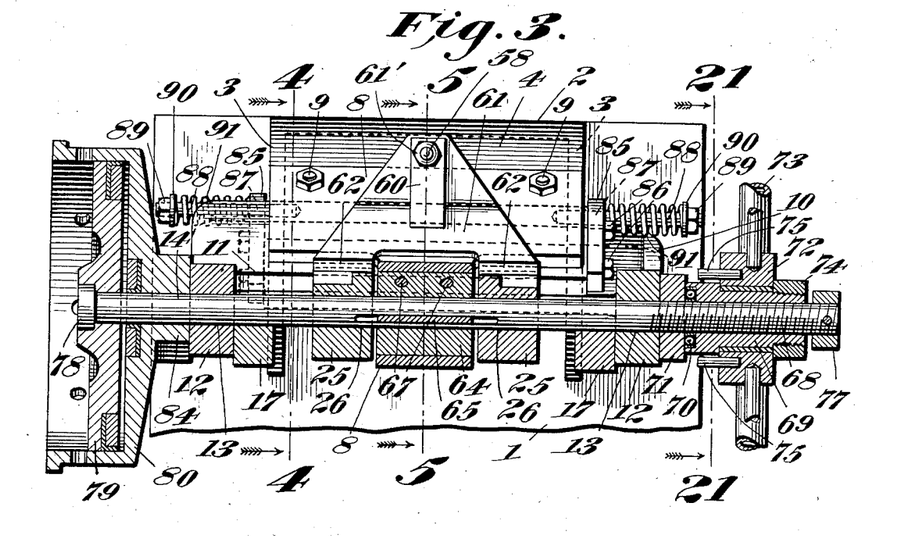
Fig. 3 is a longitudinal section taken on the line 3—3 of Fig. 2, but drawn on a larger scale.
Figure 22:
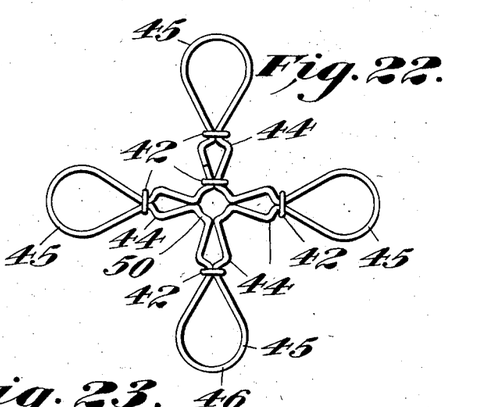
Fig. 22 is an end elevation of one of the assembled spools or reels.

Having thus given a detailed description of my invention, I will now describe the operation: Assuming that the parts are in the normal position as indicated in Figs. 1, 2 and 3 of the drawings; the operator standing in front of the machine on the base-plate 1, places his foot on the pedal 55 and depresses it thereby raising the lifter-plate 61 and the two swinging back arms 30 into the position indicated in dotted lines in Fig. 4 of the drawings. A core member 43 is inserted in the grooves 39 of their bending-dies 38, with its ends extending beyond the sides of the upwardly extending bending-die supporting portions 25. The pedal is then released thereby allowing the two swinging back arms 30 to fall by gravity and assume their normal position as indicated in full lines in said figure, in which position the shoulders 63 will lock this core member in the machine, other core members are then inserted in the grooves 39 of the four other bending-dies 38. The arms of the reel ends are then attached to the hooked ends of the core members and the tie member between the shoulders 44 and looped arms of the reel ends and the tie member between one of the shoulders, and the closed ring 50 forming the spindle bearing opening. As each of the ends of the reel are formed of one piece of wire with the ends not welded together, this tie member which is the same shape as the core members is required to hold the inner portion of the arm of one of the reel ends together and make a strong reel as will be readily understood by referring to the upper arm of the reel end illustrated in Fig. 22. The machine and assembled reel will then be in the position indicated in Figs. 1 and 2 of the drawings. The hand-wheel is then rotated to feed the nut 69 inward, thereby moving the right slide 10 from right to left when viewed from the front of the machine, until the ends of the core and tie members are in the grooves 22 of the die-sets 21. The operator then opens the valve 82 and admits fluid pressure into the cylinder 80, the slides 10 and 11 are then both advanced towards the center of the machine, by the combined movement of the piston 79 and the cylinder 80, thereby simultaneously clinching all of the ends of the tie and core members on the arms of the reel ends, as indicated in dotted lines in Fig. 15 of the drawings. The fluid pressure is then exhausted from the cylinder 80 by manipulating the valve 82, and the hand-wheel 73 rotated to unscrew the nut 69, the springs 91 will then return the slides 10 and 11 to their normal positions.

The operator then presses down on the pedal thereby again raising the swinging back arms 30 to release the tie member held thereby and manually lifts the finished reel from the machine. To accomplish this the front arms 29 are adapted to swing as indicated in dotted lines in Fig. 4. The operation above described can then be repeated.

If desired I may perform the clinching operation entirely by the manipulation of the hand-wheel 73 without reciprocating the piston 79 in the fluid pressure cylinder 80. This can be accomplished by continuing the rotation of the hand-wheel after the ends of the core members are received in the grooves 22 of the die-sets 21, or I may make the fluid pressure cylinder 80 longer so as to provide a longer stroke for the piston to reciprocate the slides 10 and 12, thereby advancing the bending-dies 38 and die-sets 21 entirely by fluid pressure thereby dispensing with the use of the hand-wheel 73 and nut 69.

Instead of manipulating the nut 69 manually by means of a hand-wheel 73, I may in some cases prefer to use power means, as indicated in Fig. 23, comprising a motor 92 having a worm 93 connected to its shaft meshing with a worm-wheel 94 mounted on the nut 69, and keyed thereto as at 95.

The motor has a reversing switch in its power circuit connections (not shown) to enable the armature of the motor to rotate in either direction, to advance or retract the nut 69 when desired.

Although I have shown and described my invention in considerable detail, I do not wish to be limited to the exact and specific details shown and described, but may use such substitptions, modifications or equivalents thereof, as are embraced within the scope of my invention, as pointed out in the claims.

Having thus described my invention, what I claim as new and desire to secure by Letters Patent is:

1. In an assembling machine for forming wire reels or the like having core members adapted to be secured to the reel ends, means for supporting the core members, means for attaching the reel ends to the ends of the core members, and means for clinching the ends of the core members on the reel ends.

2. In an assembling machine for forming wire reels or the like, having core members formed with hooked ends adapted to be secured to the reel ends, movable means for supporting the core members, means adapted for interlocking the reel ends to the hooked ends of the core members, and means for clinching the hooked ends of the core members on the reel ends.

3. In an assembling machine for forming wire reels or the like, having a tie and core members formed with hooked ends adapted to be secured to the reel ends, means for supporting the tie and core members, means for interlocking the reel ends with the hooked ends of the tie and core members, and means for clinching the hooked ends of the tie and core members on the reel ends.

4. In an assembling machine for forming wire reels or the like, having core members formed with hooked ends adapted to be secured to the arms of the reel ends, means for supporting the core members, means for interlocking the arms of reel ends to the hooked ends of the core members, and means for simultaneously clinching the hooked ends of the core members on the reel ends.

5. In an assembling machine for forming wire reels or the like, having core members formed with hooked ends adapted to be secured to the reel ends, means for supporting the core members, means for interlocking the reel ends with the core members, a bending-die and die-set adapted to coact on each hooked end of the core members, and means for advancing the bending-dies and die-sets toward each other to clinch the hooked ends of the core members on the reel ends.

6. In an assembling machine for forming wire reels or the like, having core members adapted to be secured to the reel ends, means for supporting the core members, means for attaching the reel ends to the core members, and means for bending over and clinching the ends of the core members on the reel ends.

7. In an assembling machine for forming wire reels or the like, having a tie and core members adapted to be secured to the arms of the reel ends, means for supporting the tie and core members, means for attaching the tie and core members to the reel ends, and means for simultaneously bending over and clinching the ends of the tie and core members on the arms of the reel ends.

8. In an assembling machine for forming wire reels or the like, having core members formed with hooked ends adapted to be secured to the reel ends, means for supporting the core members, means for interlocking reel ends to the hooked ends of the core members, a bending-die and die-set adapted to coact on each of the hooked ends of the core members, oppositely reciprocating slides for advancing the bending-dies and die-sets toward each other to clinch the hooked ends of the core members on the reel ends, and means for reciprocating the slides.

9. In an assembling machine for forming wire reels or the like, having tie and core members formed with hooked ends adapted to be secured to the reel ends, a pair of reciprocating slides, means carried by the slides for supporting the tie and core members, means for interlocking reel ends with the hooked ends of the tie and core members, a bending-die and die-set movable with the slides adapted to coact on each hooked end of the tie and core members, oppositely reciprocating slides for advancing the bending-dies and die-sets toward each other to clinch the hooked ends of the tie and core members on the reel ends, and means for reciprocating the slides.

10. In an assembling machine for forming wire reels or the like, having core members and ends, a pair of slides, bending-dies carried by the slides for receiving and supporting the core members, means for interlocking the ends of the core members with the reel ends, a bending-die and die-set movable by the slides toward each other to coact on each end of the core members, means for initially advancing the bending-dies and die-sets toward each other to clinch the ends of the core members on the reel ends, and means for retracting the slides.

11. In a wire reel assembling machine of the class described for assembling reels having core members with hooked ends adapted to be secured to reel ends, a pair of slides, bending-dies and die-sets carried by each slide, means adapted for interlocking the reel ends with the hooked ends of the core members, a bending-die and a die-set at each end of the core members movable with the slides toward each other to coact on each hooked end of the core members, screw-feeding means for initially advancing the die-sets simultaneously toward the core ends, fluid pressure means for simultaneously advancing the bending-dies and die-sets toward each other to clinch the hooked ends of the core members on the reel ends, and resilient means for retracting the slides.

12. In a wire reel assembling machine of the class described, a pair of slides each provided with laterally extending arms for supporting a plurality of core members having hooked ends adapted to interlock with the reel ends, a plurality of bending-dies and die-sets carried by each slide, the bending-dies carried by one slide coacting with die-sets carried by the other slide to engage the hooked ends of the core members, and means for reciprocating the slides to clinch the hooked ends of the core members on the reel ends.

13. In a wire reel assembling machine of the class described, comprising a pair of reciprocating slides, an anvil attached to each reciprocating slide, a plurality of die-sets secured to each anvil, bending-dies attached to the reciprocating slides adapted to coact with the die-sets, and means for reciprocating the slides.

14. In a machine of the class described for assembling wire reels having core members and ends, a pair of slides, a plurality of bending-dies mounted on each slide adapted to receive and support a plurality of core members having hooked ends, means for attaching the reel ends to the hooked ends of the core members, a plurality of die-sets coacting with the bending-dies mounted on each slide, means for advancing one of the slides until the die-sets engage the ends of the core members, and means for advancing the bending-dies and die-sets toward each other to clinch the hooked ends of core members on the reel ends.

15. In a machine of the class described, a pair of coacting reciprocating slides, a plurality of bending-dies mounted on each slide, the bending-dies mounted on one slide being in alignment with the bending-dies mounted on the other slide, each pair of aligned bending-dies being adapted to receive and support a core member having hooked ends, a plurality of die-sets mounted on each slide in alignment with the bending-dies, means adapted for attaching the reel ends to the hooked ends of the core members, and means for advancing the bending-dies and die-sets toward each other to clinch the hooked ends of the core members on the reel ends.

16. In a wire reel assembling machine of the class described, a pair of coacting slides provided with laterally extending arms for supporting a plurality of core members having hooked ends adapted to interlock with the reel ends, a bending-die and die-set adapted to coact on each hooked end of the core members, and means for advancing the bending-dies and die-sets toward each other to clinch the hooked ends of the core members on the reel ends.

17. In an assembling machine for forming wire reels or the like having core members attached to the reel ends, movable means for receiving and supporting a plurality of core members provided with hooked ends, means adapted for interlocking the reel ends with the hooked ends of the core members, and means for clinching the hooked ends of the core members on the reel ends.

18. In an assembling machine for forming wire reels or the like having core members attached to the arms of the reel ends, means for receiving and supporting a plurality of core members provided with hooked ends, means adapted for interlocking the arms of the reel ends with the hooked ends of the core members, a bending-die and die-set adapted to coact on each hooked end of the core members, and means for advancing the bending-dies and die-sets toward each other to clinch the hooked ends of the core members on the reel ends.

19. In an assembling machine for forming wire reels or the like having core members with hooked ends adapted to be attached to the arms of the reel ends, a pair of slides, a plurality of bending-dies carried by each slide, each of the bending-dies carried by one slide being in alignment with one of the bending-dies carried by the other slide, a plurality of die-sets carried by each slide, each die-set on one slide being in alignment with the die-set carried by the other slide and in alignment and coacting with each of the pairs of bending-dies on the other slide, means for advancing the bending-dies and die-sets toward each other to clinch the hooked ends of the core members on the arms of the reel ends, and means for retracting the bending-dies and die-sets.

20. In a machine of the class described, a pair of coacting slides, an anvil attached to each of the slides, a plurality of die-sets attached to each of the anvils, a bending-die supporting portion extending from each slide opposite each anvil, a plurality of bending-dies secured to each bending-die supporting portion in alignment with the die-sets secured to the anvil and adapted to coact therewith, and means for reciprocating the slides.

21. In a machine of the class described for assembling wire reels or the like having core members and ends, a pair of slides each having a bracket arm at one end and an upwardly extending bending-die supporting portion at an intermediate point, a feed-screw shaft passing through the bracket arms and the upwardly extending bending-die supporting portions, an anvil secured to each of the bracket arms, a plurality of die-sets secured to each anvil, a plurality of bending-dies secured to each upwardly extending bending-die supporting portions in alignment with the die-sets and coacting therewith, said aligned bending-dies adapted to receive a plurality of core members having hooked ends, means for interlocking the reel ends with the hooked ends of the core members, a nut on the feed-screw shaft, a hand-wheel mounted on the nut adapted to rotate the nut to advance one of the slides with the bending-dies and die-sets into engagement with the ends of the core members to clinch the hooked ends of the core members on the reel ends, and resilient means for retracting the slide.

22. In a machine of the class described for assembling wire reels having core members with hooked ends adapted to be secured to the reel ends, a pair of slides, means formed integral with the slides for supporting the core members, means adapted for interlocking and supporting the reel ends by the hooked ends of the core members, a bending-die and die-set carried by the slides adapted to coact on each hooked end of the core members, a feed-screw shaft supported in bearings formed integral with the slides, a nut on the feed-screw shaft, a hand-wheel rotatably mounted on the nut adapted to rotate the nut to advance one of the slides with the bending-dies and die-sets into engagement with the hooked ends of the core members to clinch the hooked ends of the core members on the reel ends, and resilient means for retracting the slides.

23. In an assembling machine for forming wire reels or the like having core members with hooked ends adapted to be secured to the reel ends, a pair of reciprocating slides having means for supporting the core members, means for attaching the reel ends to the hooked ends of the core members, means for locking one of the core members, a bending-die and die-set carried by the slide adapted to coact on each hooked end of the core members, and means for actuating the reciprocating slides to advance the bending-dies and die-sets toward each other to clinch the hooked ends of the core members on the reel ends.

24. In a machine of the class described, a pair of reciprocating slides, a plurality of bending-dies and die-sets carried by each slide, the bending-dies and die-sets carried by one slide being in alignment with the bending-dies and die-sets carried by the other slide, said bending-dies adapted to support a plurality of core members having hooked ends extending beyond the bending-dies, means for attaching the reel ends to the hooked ends of the core members, a plurality of aligned bending-dies and die-sets carried by each slide, the bending-die carried by one slide coacting with the die-sets carried by the other slide, a feed-screw shaft supported in bearings formed on the slides, a nut on the feed-screw shaft, a hand-wheel for rotating the nut to advance one of the slides until the die-sets engage the hooked ends of the core members, and fluid pressure operated means secured to the feed-screw shaft for actuating the reciprocating slides in opposite directions to advance the bending-dies and die-sets toward each other to clinch the hooked ends of the core members on the reel ends.

25. In a machine for assembling wire reels or the like, a pair of slides each provided with an extending bending-die supporting portion having bending-dies mounted therein, a plurality of swinging arms pivoted to the extending bending-die supporting portions, a bending-die mounted in each of the swinging-arms, said bending-dies carried by one slide being in alignment with the bending-dies carried by the other slide, each pair of said aligned bending-dies being adapted to receive a core member having hooked ends, means for attaching the reel ends to the hooked ends of the core members, a bracket arm extending laterally from each slide, an anvil secured to each bracket arm opposite each extending bending-die supporting portion, a plurality of die-sets secured to each anvil in alignment with the bending-dies, and means for reciprocating the slides to clinch the hooked ends of the core members on the reel ends.

26. In a machine for assembling wire reels or the like, a pair of slides, a plurality of pairs of aligned bending-dies carried by the slides, a plurality of die-sets carried by the slides, each arranged in alignment and coacting with one of the bending-dies, and means for reciprocating the slides.

27. In a machine for assembling wire reels or the like having core members and ends, a pair of slides, a plurality of pairs of aligned bending-dies carried by the slides, each of said pairs of aligned bending-dies being adapted to receive a core member having hooked ends adapted to interlock with the reel ends, a plurality of die-sets carried by the slides each arranged in alignment and coacting with one of the bending-dies to clinch the hooked ends of the core member on the reel ends, and means for reciprocating the slides.

28. In a machine for assembling wire reels or the like having core members and ends, a pair of slides, a plurality of pairs of aligned bending-dies carried by the slides, each of said pairs of aligned bending-dies being adapted to receive a core member having hooked ends adapted to interlock with the reel ends, a pair of bending-dies carried by the slides for receiving and supporting a tie member having hooked ends adapted to interlock with the reel ends, a plurality of die-sets carried by the slides, each arranged in alignment and coacting with one of the bending-dies to clinch the hooked ends of the tie and core members on the reel ends, and means for reciprocating the slides in opposite directions.

29. In a machine for assembling wire reels or the like having core members and ends, a pair of slides, a plurality of pairs of aligned bending-dies carried by the slides in fixed relation thereto, a plurality of pairs of aligned bending-dies mounted in swinging arms carried by the slides, each of said pairs of stationary and movable bending-dies being adapted to receive a core member having hooked ends adapted to interlock with the reel ends, a plurality of die-sets carried by the slides each arranged in alignment and coacting with one of the bending-dies to clinch the hooked ends of the core members on the reel ends, and means for reciprocating the slides in opposite directions.

30. In a machine for assembling wire reels or the like having core members and ends, a pair of slides, a plurality of pairs of aligned bending-dies carried by the slides, said pairs of aligned bending-dies being adapted to receive a core member having hooked ends adapted to interlock with the reel ends, a plurality of die-sets carried by the slides, each arranged in alignment and coacting with one of the bending-dies, means for initially advancing one of the slides until the die-sets engage the ends of the core members, means for moving the slides in opposite directions to advance the bending-dies and die-sets toward each other to clinch the hooked ends of the core members on the reel ends, and means for retracting the slides.

31. In a machine for assembling wire reels or the like having core members and ends, a pair of slides, a plurality of pairs of aligned bending-dies carried by the slides, said pairs of aligned bending-dies being adapted to receive a core member having hooked ends extending beyond the bending-dies, means for attaching the reel ends to the hooked ends of the core members, a plurality of die-sets mounted adjacent to the bending-dies and carried by the slides each arranged in alignment and coacting with one of the bending-dies, screw-feeding means for initially advancing one of the slides until the die-sets engage the hooked ends of the core members, means operated by fluid pressure for actuating the slides in opposite directions to advance the bending-dies and die-sets toward each other to clinch the hooked ends of the core members on the reel ends, and resilient means for retracting the slides.

32. In an assembling machine for forming wire reels or the like, having core members with hooked ends adapted to be secured to the reel ends, means for supporting the core members, means for attaching the reel ends to the hooked ends of the core members, and means operated by fluid pressure for engaging and clinching the hooked ends of the core members to the reel ends.

33. In an assembling machine for forming wire reels or the like, having core members with hooked ends adapted to be secured to the reel ends, a plurality of pairs of aligned bending-dies for supporting each core member, reciprocating means for supporting the bending-dies, means for attaching the reel ends to the hooked ends of the core members, a die-set coacting with each bending-die, and means operated by fluid pressure adapted to advance the bending-dies and die-sets toward each other to clinch the hooked ends of the core members on the reel ends.

34. In an assembling machine for forming wire reels or the like, a pedestal having an upper inclined head portion, a slide-plate attached to opposite sides of the head portion and projecting laterally therefrom a pair of reciprocating slides mounted between the laterally projecting slide-plates, a bracket arm extending from one end of each slide, an anvil secured to each bracket arm, a plurality of die-sets secured to each anvil, a bending-die supporting portion extending from each slide at an intermediate point, bending-dies mounted in said supporting portions, the bending-dies carried by one slide being in alignment with the bending-dies carried by the other slide and each adapted to coact with one of the die-sets, a feed-screw shaft mounted in the bracket arms and the bending-die supporting portions, a spacing-block between the slide-plates keyed to the feed-screw shaft between the bending-die supporting portions, and means for reciprocating the slides.

35. In an assembling machine for forming wire reels or the like having core members and reel ends, a pair of coacting slides, a plurality of bending-dies carried by each slide, each bending-die carried by one slide being in alignment with each bending die carried by the other slide, each of said pairs of aligned bending-dies being adapted to receive a core member having hooked ends for interlocking with the reel ends having central spindle bearing openings, a die-set carried by the slides coacting with each bending-die to clinch the hooked ends of the core members on the reel ends, an expander mounted between the bending-dies carried by each slide adapted to extend into and expand the central spindle bearing opening in the reel end, and means for reciprocating the slides.

36. In an assembling machine for forming wire reels or the like having core members with hooked ends attached to the arms of the reel ends, a pair of coacting slides, a plurality of bending-dies carried by each slide, each bending-die carried by one slide being in alignment with each bending-die carried by the other slide, each pair of said aligned bending-dies being adapted to receive a core member having hooked ends, means for attaching the hooked ends of the core members to the arms of the reel ends, a die-set carried by the slides co-acting with each bending die to clinch the hooked ends of the core members on the reel ends, a fluid pressure operated piston for actuating a slide in one direction and a movable cylinder operated by fluid pressure to actuate the other slide in the opposite direction.

37. In an assembling machine for forming wire reels or the like, a pair of coacting slides, a plurality of aligned bending-dies carried by the slides, a plurality of die-sets carried by the slides, each adapted to coact with a bending-die, a longitudinally movable feed-screw shaft mounted in bearings extending from the slides, a movable cylinder attached to one of the slides, and a piston secured to the feed-screw shaft mounted in said movable cylinder adapted to actuate the slides in opposite directions.

38. In an assembling machine for forming wire reels or the like, a pair of coacting slides, a plurality of aligned bending-dies carried by the slides adapted to support a plurality of core members having hooked ends, means for attaching reel ends to the hooked ends of the core members, means for locking one of the core members in the machine, a plurality of die-sets carried by the slides, each adapted to coact with a bending-die to clinch the hooked ends of the core members on the reel ends, a feed-screw shaft mounted in bearings formed integral with the slides, means for initially actuating one of the slides, a movable cylinder attached to one of the slides, and a piston secured to the feed-screw shaft mounted in said movable cylinder and actuated by fluid pressure to move the slides in opposite directions.

39. In a machine of the class described for assembling wire reels or the like having core members and ends, a pair of slides each provided with an extending bending-die supporting portion having a plurality of bending-dies mounted therein, a plurality of swinging arms pivoted to each of the extending bending-die supporting portions, a bending-die mounted in each of the swinging-arms, said bending-dies carried by one slide being in alignment with the bending-dies carried by the other slide, each pair of said aligned bending-dies being adapted to receive and support a core member having hooked ends, a lifter plate operated by means of a pedal for raising one pair of swinging arms to allow a core member to be inserted in their bending-dies, means for automatically locking the core member in the bending-dies after the pedal is released, means for attaching the reel ends to the hooked ends of the core members, a bracket arm extending laterally from each slide, an anvil secured to each bracket arm opposite each extending bending-die supporting portions, a plurality of die-sets secured to each anvil in alignment with the bending-dies, and means for reciprocating the slides to simultaneously clinch all of the hooked ends of the core members on the reel ends.

40. In an assembling machine for forming wire reels or the like, a pedestal having an upper head portion, a slide-plate attached to opposite sides of the head portion of the pedestal and projecting therefrom, a pair of slides mounted between the projecting slide-plates, a plurality of bending-dies carried by each slide, a die-set carried by the slides mounted opposite each bending-die and coacting therewith, a feed-screw shaft supported in bearings formed integral with the slides, a nut on the feed-screw shaft for advancing one of the slides, fluid pressure actuated means mounted on the feed-screw shaft for actuating the slides in opposite directions, and resilient means for returning the slides to their normal positions.

HARRY R. GEER.